(12) United States Patent
Eisenbraun

(10) Patent No.: US 7,130,666 B2
(45) Date of Patent: Oct. 31, 2006

(54) CELL PHONE CHARGER WITH INCOMING CALL INDICATOR

(75) Inventor: Kenneth D. Eisenbraun, Bloomfield Village, MI (US)

(73) Assignee: United Global Sourcing, Inc., Troy, MI (US)

( * ) Notice: Subject to any disclaimer, the term of this patent is extended or adjusted under 35 U.S.C. 154(b) by 405 days.

(21) Appl. No.: 10/715,727

(22) Filed: Nov. 18, 2003

(65) Prior Publication Data

US 2004/0127264 A1 Jul. 1, 2004

Related U.S. Application Data

(60) Provisional application No. 60/427,297, filed on Nov. 18, 2002.

(51) Int. Cl.
*H04B 1/38* (2006.01)

(52) U.S. Cl. .................. 455/573; 455/556.1

(58) Field of Classification Search ............ 455/550.1, 455/556.1, 571, 573, 572
See application file for complete search history.

(56) References Cited

U.S. PATENT DOCUMENTS

| | | | |
|---|---|---|---|
| 3,819,873 A | 6/1974 | Stockton et al. ............... | 179/84 |
| 3,842,216 A | 10/1974 | Owen et al. .................. | 179/84 |
| 4,467,266 A * | 8/1984 | Ritchie ....................... | 320/116 |
| 4,853,607 A * | 8/1989 | Walter et al. ................ | 320/154 |
| 4,951,311 A | 8/1990 | Sterr ........................... | 379/376 |
| 5,918,187 A * | 6/1999 | Weng ........................... | 455/573 |
| 5,959,433 A | 9/1999 | Rohde ......................... | 320/108 |
| 2002/0061772 A1 | 5/2002 | Hayashi ....................... | 455/567 |
| 2002/0115478 A1 | 8/2002 | Fujisawa et al. ............. | 455/567 |
| 2002/0117996 A1* | 8/2002 | Cheng ......................... | 320/114 |
| 2003/0001543 A1* | 1/2003 | Eisenbraun .................. | 320/162 |
| 2003/0117104 A1* | 6/2003 | Liao ........................... | 320/107 |
| 2004/0061943 A1* | 4/2004 | Bosch et al. ................. | 359/599 |
| 2005/0024873 A1* | 2/2005 | Cope .......................... | 362/253 |
| 2005/0104557 A1* | 5/2005 | Chang ......................... | 320/111 |

* cited by examiner

*Primary Examiner*—Edward F. Urban
*Assistant Examiner*—Nhan T. Le
(74) *Attorney, Agent, or Firm*—Gifford, Krass, Groh, Sprinkle, Anderson & Citkowski, P.C.

(57) ABSTRACT

The present invention provides a battery charger for cell phones which operates off the cigarette lighter receptacle of a vehicle. The battery charger includes a visual indication that is activated by electromagnetic induction from the ringing current that is generated when the cell phone receives an incoming call. An incoming call sensing circuit operates to receive the electromagnetic signal that includes the incoming call signal to the user's cell phone. The electromagnetic signal is filtered and rectified by a conditioning and activation circuit such that only an incoming call signal remains thereafter the incoming call signal is transmitted to a visual indicator circuit having at least one light source for causing the at least one light source to illuminate such that the user is alerted to the incoming call.

5 Claims, 2 Drawing Sheets

CELL PHONE CHARGER WITH INCOMING CALL INDICATOR

RELATED APPLICATIONS

This application claims the benefit of U.S. Provisional Patent Application Ser. No. 60/427,297 filed Nov. 18, 2002.

FIELD OF THE INVENTION

The present invention relates to a battery charger for use with portable electronic devices and more particularly to a cell phone battery charger that couples to a vehicle battery power source and includes an electronic circuit for visual indication of an incoming call.

BACKGROUND OF THE INVENTION

Portable devices such as cell phones and handheld computers are often charged by using a battery charger that couples to the cigarette lighter receptacle of a vehicle. During charging the cell phone remains fully functional for the user to make outgoing calls or to receive incoming calls. Sometimes the sounds being output by the radio while riding in a vehicle makes it difficult to hear a cell phone ring upon receipt of an incoming call, and/or the cell phone may not be equipped with display/keypad backlighting to alert the user to the incoming call. At other times, the cell phone may be resting in a position that prevents the user from seeing a visual indicator of an incoming call that is disposed on the phone preventing the user from being alerted to the incoming call. Accordingly, the present invention provides a cell phone battery charger for use in a vehicle that includes a means for providing a visual indication to the user that an incoming call is being received by the cell phone when the radio output level is high and when a visual indicator disposed on the phone cannot be seen due to the phones position.

SUMMARY OF THE INVENTION

The present invention provides a cell phone battery charger that includes a visual indicator operative to alert a user to an incoming call under conditions where the user might not otherwise be alerted to the incoming call by audible means.

The inventive battery charger includes a housing having first and second ends wherein the first end of the housing is dimensioned for slip fit engagement into a cigarette lighter receptacle of a vehicle. The first end of the housing includes electrical contacts for complimentary engagement with the electrical contacts disposed within the cigarette lighter receptacle.

The second end of the housing includes an electrical conductor attached thereto for the purpose of conducting electrical signals between the charger housing and the cell phone. The free end of the electrical conductor terminates into an electrical connector for connecting to the cell phone-charging jack.

A charger circuit is disposed within the housing and is in electrical communication with the electrical contacts disposed at the first end of the housing and also with the electrical conductor attached at the second end of the housing.

The charger includes at least one light source supported by the housing and is operative to provide a visual indication to the user of an incoming call.

The at least one light source is provided in electrical communication with an incoming call sensing circuit. The sensing circuit operates to detect an incoming call signal into the cellular phone and to produce an electrical signal in response to detecting the incoming call signal. The incoming call sensing circuit is further operative to communicate the electrical signal produced in response to the incoming call signal to the at least one light source to cause the light source to illuminate accordingly.

BRIEF DESCRIPTION OF THE DRAWINGS

A better understanding of the present invention will be had upon reference to the following detailed description when read in conjunction with the accompanying drawings in which like parts are given like reference numerals and where it.

DETAILED DESCRIPTION OF THE INVENTION

The present invention provides a cell phone battery charger that includes a visual indicator operative to alert a user to an incoming call under conditions where the user might not otherwise be alerted to the incoming call by audible means.

Figure 1:
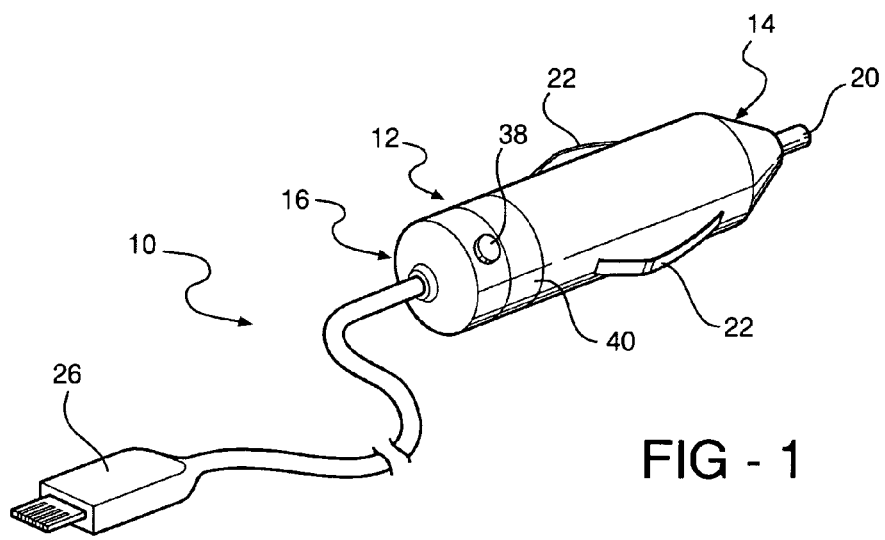
FIG. 1 is a perspective view of the cell phone charger with incoming call indicator as according to the invention.

With reference to FIG. 1 a battery charger according to the invention includes a housing 12 having a first end 14 and second end 16 wherein the first end 14 of the housing 12 is dimensioned to be received into a cigarette light receptacle of a vehicle in slip fit engagement. The first end 14 of the housing 12 also includes a positive electrical contact 20 for communication with the complimentary positive contact of the electrical receptacle, and negative electrical contacts 22 for engaging the complimentary negative electrical contacts of the cigarette lighter receptacle.

The second end 16 of the housing 12 includes an electrical conductor 24 attached thereto for the purpose of conducting electrical signals between the inventive charger 10 and the cell phone P to be charged. The free end of the electrical conductor 24 terminates into an electrical connector 26 for connecting to the cell phone P to be charged.

Figure 2:
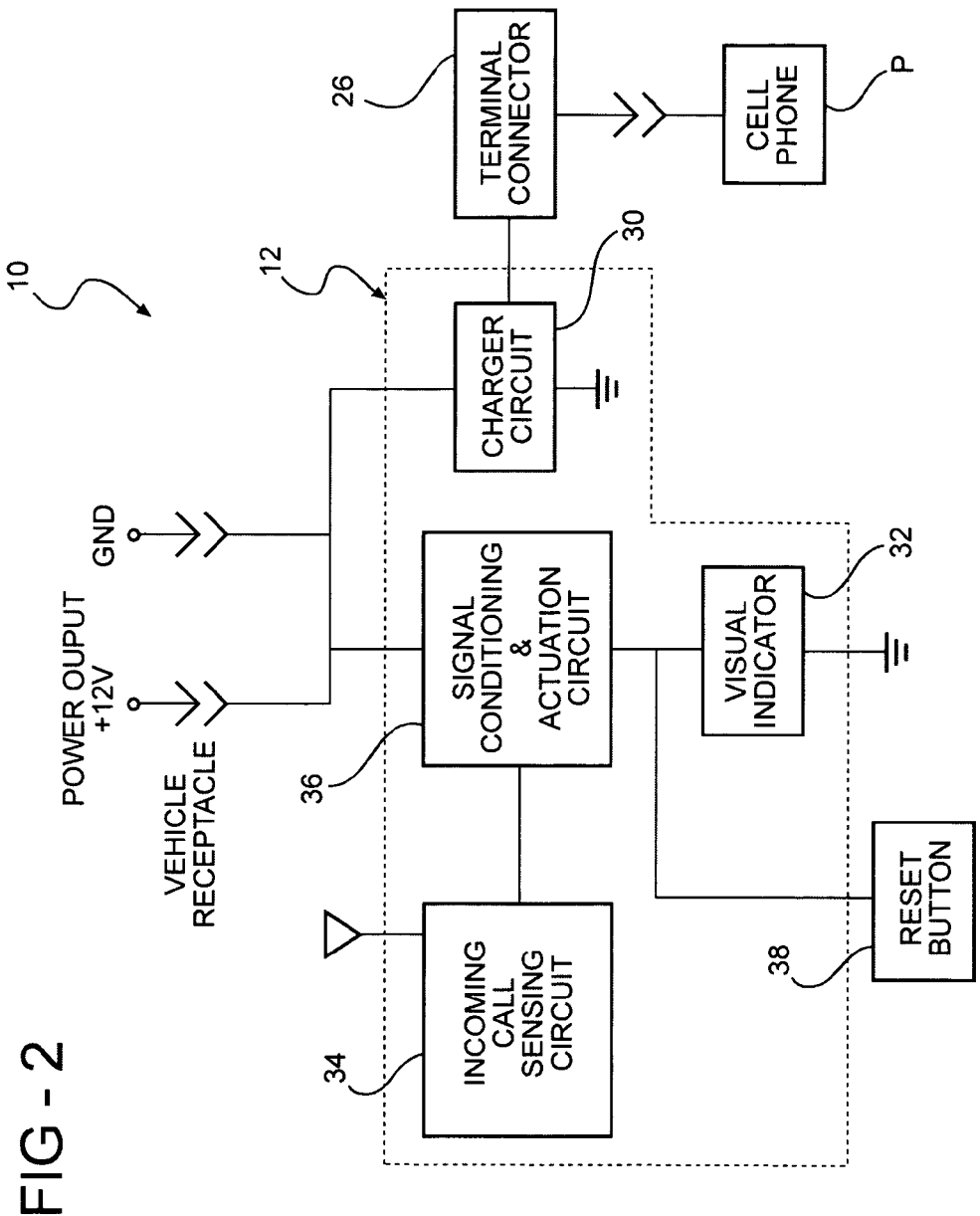
FIG. 2 is a block diagram view of a preferred embodiment of the cell phone charger with incoming call indicator.

Referring now to FIG. 2 a charger circuit 30 is disposed within the housing 12 and is in electrical communication with the electrical contacts 20 and 22 disposed at the first end 14 of the housing 12 and the electrical conductor 24 attached at the second end 16 of the housing 12.

The battery charger 10 includes a visual indicator circuit 32 having at least one light source disposed in the housing 12. The visual indicator circuit 32 is operative to provide a visual indication to the user when an incoming call is detected.

The visual indicating circuit 32 is provided in electrical communication with an incoming call sensing circuit 34 disposed within the housing 12. The incoming call sensing circuit 34 operates to detect an incoming call signal to the cellular phone P and thereafter to produce and electrical signaling response to detecting the incoming call signal. The incoming call sensing circuit 34 is further operative to communicate the electrical signal produced in response to the incoming call signal to the visual indicator circuit 32 to cause the light source to illuminate accordingly. Preferably, the visual indicating circuit 32 causes the at least one light source to continue to illuminate after the incoming call has been detected and until the visual indicator circuit 32 has been reset.

In this matter, if a user of the inventive battery charger is not immediately alerted to the occurrence of an incoming call during the detection period, the continued illumination of the at least one light source provides a means of alerting the user that an incoming call has been received.

Preferably, the light source contained within the inventive battery charger 10 is a solid state device such as an LED although other light emitting devices may be utilized for such purpose illustratively including incandescent bulbs.

The visual indicator circuit 32 may include the capability to cause the light source to flash intermittently in response to receiving an incoming call signal from the incoming call circuit 34. This feature may add to the capability of the battery charger to alert the user of an incoming call while the call is being detected.

As shown in FIG. 1, the battery charger 10 may include a signal conditioning and activation circuit 36 disposed between the incoming call circuit 34 and the visual indicator circuit 32. The signal conditioning and the activation circuit 36 is operative to receive the incoming call signal for conditioning and thereafter transmitting an electrical signal to the visual indicator circuit 32 for activating the at least one light source. The signal conditioning and activation circuit 36 may illustratively be comprised of an amplifier circuit, rectification circuit, and a solid state switch for activating the visual indicator circuit 32.

Figure 3:
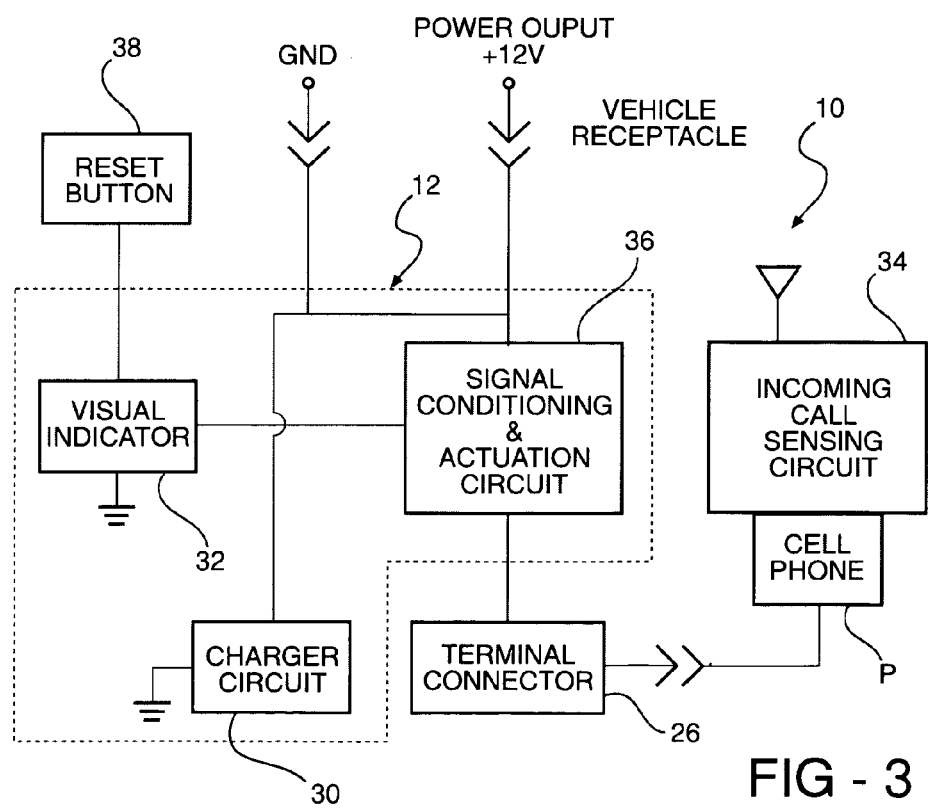
FIG. 3 illustrates a black diagram of an alternative embodiment of the cell phone charger with incoming call indicator as according to the invention.

As illustrated in FIGS. 2 and 3, a reset button 38 is preferably disposed on the housing 12 and placed in communication with the visual indicator circuit 32 as described above, the visual indicator circuit 32 may be designed to continuously illuminate the at least one light source upon detecting an incoming call signal until the visual indicator call circuit 32 is reset. Accordingly, the reset button 38 is provided on the battery charger housing 12 in a manner that allows a user to simply push the reset button 38 to reset the visual indicator circuit 32 as needed.

Referring now to FIG. 3, an alternative embodiment of the battery charger 10' is illustrated in a block diagram, the alternative embodiment is operative to receive an incoming call signal from the cell phone P from an incoming call sensing circuit disposed within the cell phone P as opposed to having the incoming call sensing circuit disposed within the battery charger housing 12. The incoming call signal may be coupled to the battery charger 10' via the terminal connector 26 and conductor 24 in a manner known to those skilled in the art. Accordingly, the incoming call sensing circuit obviates the need for an incoming call sensing circuit being disposed within the battery charger 10 prime.

From the foregoing, a cell phone battery charger with incoming call indicator capabilities is provided that is operative to alert a user to an incoming call under the conditions where the user might not otherwise be alerted to the incoming call by audible means. Having described the invention in detail, however, additional features and embodiments may become apparent to those skilled in the art, however, without seeing the scope of the present invention.

I claim:

1. A battery charger for a cellular phone for use in a vehicle having a cigarette lighter receptacle, said charger comprising:
    a housing having first and second ends, said first end of said housing being dimensioned for slip fit engagement into the cigarette lighter receptacle and includes electrical contacts for electrically communicating with complementary electrical contacts disposed within the cigarette lighter receptacle, said second end of said housing having an electrical conductor attached thereto that terminates in an electrical connector for connecting to the cellular phone;
    a charger circuit disposed within said housing; said charger circuit in electrical communication with said electrical contacts of said housing and said electrical conductor;
    a visual indicator circuit having at least one light source supported within said housing
    a reset button disposed on said housing and in communication with said visual indicator circuit; and
    an incoming call sensing circuit in electrical communication with said visual indicator circuit, said incoming call sensing circuit operative to detect an incoming call signal to said cellular phone and to produce an electrical signal in response to detecting said incoming call signal, said incoming call sensing circuit being further operative to communicate said electrical signal to said visual indicator circuit for causing said at least one light source to illuminate after an incoming call signal has been detected until said visual indicator circuit has been reset.

2. A battery charger for a cellular phone for use in a vehicle having a cigarette lighter receptacle, said charger comprising:
    a housing having first and second ends, said first end of said housing being dimensioned for slip fit engagement into the cigarette lighter receptacle and includes electrical contacts for electrically communicating with complementary electrical contacts disposed within the cigarette lighter receptacle, said second end of said housing having an electrical conductor attached thereto that terminates in an electrical connector for connecting to the cellular phone;
    a charger circuit disposed within said housing; said charger circuit in electrical communication with said electrical contacts of said housing and said electrical conductor;
    a visual indicator circuit having at least one light source supported within said housing;
    an incoming call sensing circuit in electrical communication with said visual indicator circuit, said incoming call sensing circuit operative to detect an incoming call signal to said cellular phone and to produce an electrical signal in response to detecting said incoming call signal, said incoming call sensing circuit being further operative to communicate said electrical signal to said visual indicator circuit for causing said at least one light source to illuminate wherein said visual indicator circuit is operative to cause said at least one light source to continue to illuminate after said incoming call signal has been detected until said visual indicator circuit has been reset; and
    a reset button disposed on said housing and in communication with said visual indicator circuit, said reset button operative to cause said visual indicator circuit to be reset when pushed.

3. The battery charger of claim 2 wherein said at least one light source is a solid-state device.

4. The battery charger of claim 3 wherein said solid-state device is a light emitting diode.

5. The battery charger of claim 2 wherein said at least one light source flashes in response to receiving said electrical signal from said sensing circuit.

* * * * *